United States Patent
Kawasaki et al.

(10) Patent No.: US 11,866,802 B2
(45) Date of Patent: Jan. 9, 2024

(54) METHOD FOR RECOVERING PLATINUM GROUP METALS

(71) Applicant: DOWA METALS & MINING CO., LTD., Tokyo (JP)

(72) Inventors: Minoru Kawasaki, Tokyo (JP); Hiromitsu Yatsuhashi, Tokyo (JP); Nobuaki Kita, Tokyo (JP)

(73) Assignee: DOWA METALS & MINING CO., LTD., Tokyo (JP)

( * ) Notice: Subject to any disclaimer, the term of this patent is extended or adjusted under 35 U.S.C. 154(b) by 2 days.

(21) Appl. No.: 17/558,717

(22) Filed: Dec. 22, 2021

(65) Prior Publication Data

US 2023/0045764 A1    Feb. 9, 2023

(30) Foreign Application Priority Data

Jul. 29, 2021   (JP) ................................ 2021-124293

(51) Int. Cl.
  *C22B 11/02*   (2006.01)
  *C22B 1/00*    (2006.01)
  *C22B 7/00*    (2006.01)

(52) U.S. Cl.
  CPC .............. *C22B 11/02* (2013.01); *C22B 1/005* (2013.01); *C22B 7/003* (2013.01); *C22B 11/026* (2013.01)

(58) Field of Classification Search
  CPC .......... C22B 11/02; C22B 1/005; C22B 7/003
  See application file for complete search history.

(56) References Cited

U.S. PATENT DOCUMENTS

| 2009/0071289 A1* | 3/2009 | Fekete | ...................... C22B 1/06 75/631 |
| 2023/0045764 A1* | 2/2023 | Kawasaki | ............. C22B 11/026 |

FOREIGN PATENT DOCUMENTS

| GB | 2465603 A * | 5/2010 | ............. C22B 11/02 |
| JP | 2000-248322 | 9/2000 | |
| JP | 2004-277792 | 10/2004 | |

* cited by examiner

*Primary Examiner* — Scott R Kastler
(74) *Attorney, Agent, or Firm* — Clark & Brody LP

(57) ABSTRACT

A method for recovering platinum group metals, includes melting a material to be treated containing platinum group metals, under heating in a furnace, along with a copper source material containing at least one kind of metallic copper and copper oxide, a flux component, and a reducing agent. The molten metal absorbing the platinum group metals is separated from a slag oxide through difference in specific gravity. The molten metal absorbing the platinum group metals is subjected to an oxidation treatment. An oxide layer containing as a major component copper oxide and a molten metal containing as a major component metallic copper containing the platinum group metals concentrated therein are separated through difference in specific gravity. A silver content in the molten metal separated in melting under heating is controlled to 2,000 ppm or more and 8,000 ppm or less, thereby recovering platinum group metals with high efficiency.

6 Claims, No Drawings

METHOD FOR RECOVERING PLATINUM GROUP METALS

BACKGROUND OF THE INVENTION

Technical Field

The present invention relates to a method for recovering platinum group metals (which may be hereinafter abbreviated as PGM) and gold from substances containing platinum group metals, such as used petrochemical catalysts, waste catalysts for cleaning automobile exhaust gas, and used electronic boards and lead frames.

Background Art

As a method for recovering platinum group metals from substances containing platinum group metals, such as used catalysts for cleaning automobile exhaust gas, wet methods and dry methods have been known, but the wet methods have a problem in recovery ratio and cost, and thus is not practical.

Instead of the wet methods, the present applicant has proposed a method for recovering platinum group metals with high yield at low cost by subjecting a waste catalyst for cleaning automobile exhaust gas or the like containing platinum group metals to an oxidation treatment along with metallic copper, separating the carrier and the like of the waste catalyst as a slag oxide, and concentrating the platinum group metals by allowing the platinum group metals to be absorbed by molten copper (see JP-A-2000-248322).

However, in the method for recovering platinum group metals described in JP-A-2000-248322, the platinum group metals may partially migrate to the slag oxide formed through the oxidation treatment, in some cases depending on the properties of the slag oxide. In view of the problem, the present applicant has found that the amount of the platinum group metals migrating to the slag oxide can be reduced by sufficiently allowing the molten metal and the slag oxide to stand statically in a furnace at an appropriate temperature. However, even though the period of time of statically standing of the molten metal and the slag oxide after the oxidation treatment is prolonged, the amount of the platinum group metals migrating to the slag oxide may not be reduced in some cases. As a result of the investigations by the present applicant, it has been found that the cause thereof is that the composition of the material to be treated containing platinum group metals subjected to the oxidation treatment largely fluctuates depending on the lot, and the platinum group metals are difficult to be absorbed by the molten metal in the case where a high viscosity slag is formed in the heat treatment in the electric furnace.

Under the circumstances, the present applicant has found that the amount of platinum group metals migrating to the slag oxide can be stably reduced in such a manner that the content of at least oxides of Al, Si, and Fe in the slag forming components in the material to be treated containing the platinum group metals is analyzed and comprehended in advance, and the composition of the flux component input in the furnace is controlled corresponding to the content of the oxides (see JP-A-2004-277792).

SUMMARY OF THE INVENTION

However, even though the improvement described in JP-A-2004-277792 is effected, the amount of the platinum group metals migrating to the slag oxide is increased to an unignorable extent in some cases depending on the properties of the slag oxide formed. As a result of the earnest investigations in this point by the present inventors, it has been found that there is correlative relationship between the component in the molten metal obtained by melting the material to be treated containing platinum group metals under heating and the amount of the platinum group metals migrating to the slag oxide, and in particular, the amount of the platinum group metals migrating to the slag oxide is influenced by the content of silver contained in the molten metal.

An object of the present invention is to provide a method for recovering platinum group metals by subjecting a material to be treated containing platinum group metals to a heat treatment along with a copper source material formed of at least one kind of metallic copper and copper oxide, a flux component, and a reducing agent, in which the recovery ratio of the platinum group metals is further enhanced by suppressing the migration of the platinum group metals to the slag oxide.

The present inventors have found that in the aforementioned method for recovering platinum group metals, the migration of the platinum group metals to the slag oxide can be suppressed by controlling the silver concentration in the molten metal, and thus have completed the present invention.

For achieving the object, the present invention relates to the following.

[1] A method for recovering platinum group metals, including:

melting a material to be treated containing platinum group metals, under heating in a furnace, along with a copper source material containing at least one kind of metallic copper and copper oxide, a flux component, and a reducing agent;

separating a molten metal absorbing the platinum group metals, and a slag oxide, through difference in specific gravity;

then subjecting the molten metal absorbing the platinum group metals to an oxidation treatment; and separating an oxide layer containing copper oxide as a major component, and a molten metal containing metallic copper as a major component containing the platinum group metals concentrated therein, through difference in specific gravity, a silver content in the molten metal separated in melting under heating being controlled to 2,000 ppm or more and 8,000 ppm or less.

[2] The method for recovering platinum group metals according to the item [1], wherein the molten metal separated in melting under heating preferably has a mass ratio Ag/PGM of the silver content to a platinum group metal content of 0.2 or more and 0.8 or less.

[3] The method for recovering platinum group metals according to the item [1] or [2], wherein the oxidation treatment is preferably performed under supplying an oxygen-containing gas having an oxygen concentration of 27% by volume or more and 100% by volume or less, or oxygen.

[4] The method for recovering platinum group metals according to any one of the items [1] to [3], wherein the material to be treated containing platinum group metals is preferably pulverized before inputting in the furnace to have a maximum particle diameter of less than 400 μm.

[5] The method for recovering platinum group metals according to any one of the items [1] to [4], wherein the copper source material is preferably added in an amount of 0.3 or more and 0.9 or less in terms of mass ratio with respect to the material to be treated containing platinum group metals.

[6] The method for recovering platinum group metals according to any one of the items [1] to [5], wherein the separated oxide containing as a major component copper oxide may be reused as the copper source material.

According to the present invention, the migration of platinum group metals to the slag oxide can be suppressed, and the recovery ratio of the platinum group metals can be further enhanced, by controlling the silver content in the molten metal obtained through the heat treatment of the material to be treated containing platinum group metals.

DETAILED DESCRIPTION OF THE EMBODIMENTS

[Material to be Treated]

The platinum group metals (PGM) mean six elements, i.e., ruthenium (Ru), rhodium (Rh), palladium (Pd), osmium (Os), iridium (Ir), and platinum (Pt), and the expression "PGM" means not only an elemental substance of the metal, but also a combination of two or more kinds of the metals. While the present invention relates to a method for recovering PGM, the method can also be applied to recovery of gold (Au) in addition to PGM.

In the method for recovering platinum group metals of the present invention, examples of the material to be treated containing PGM applicable thereto include used petrochemical catalysts containing platinum, palladium, and the like, and used catalysts for cleaning automobile exhaust gas containing platinum, palladium, rhodium, and the like, and also include rejected lots and scraps obtained in the production process of these catalysts, and used electronic boards, digital components, and lead frames containing palladium and the like.

The material to be treated containing platinum group metals is subjected to a heat melting treatment in an electric furnace, and for enhancing the rate of the reaction occurring in the heat melting treatment, the material to be treated is preferably crashed, pulverized, and mixed to fine particles, before inputting in the electric furnace. By forming the material to be treated into fine particles before inputting in the electric furnace, the reaction rate can be enhanced, and the absorption of PGM to the molten metal is facilitated. In this case, the maximum particle diameter of the fine particles is preferably approximately 50 mm. The material to be treated may be pulverized, for example, with a jaw crusher as a primary pulverizer, and a double roll crusher as a secondary pulverizer. In the case where the material to be treated includes foreign matters, such as iron scraps, a magnetic separator may be disposed before or after the crusher.

The material to be treated after forming into fine particles is preferably measured for the average silver content of the fine particles in advance, as described later, and in this case, the maximum particle diameter of the fine particles to be analyzed is preferably 400 μm or less, and more preferably 350 μm or less, through fine pulverization with a pulverizer or the like.

In this case, the fine particles to be analyzed is preferably further pulverized with a vibration mill or the like to an average particle diameter of 10 μm or less, and more preferably 5 μm or less. The average particle diameter thereof may be 1 μm or more since no further difference is found in the analysis result with an average particle diameter of less than 1 μm obtained through prolongation of the pulverization time or the like.

[Copper Source Material]

In the method for recovering platinum group metals of the present invention, one kind or two kinds of metallic copper and copper oxide are used as the copper source material. These copper source materials may not necessarily have particularly high purity. In melting the copper source material with the material to be treated containing platinum group metals, the flux component, and the reducing agent under heating in the furnace, the metallic copper is melted, and simultaneously a part or the whole of the copper oxide is reduced and melted as metallic copper, so as to form a molten metal having the platinum group metals dissolved therein. By subjecting the resulting molten metal to the oxidation treatment described later, a part of the metallic copper constituting the molten metal is oxidized to form copper oxide, and the copper oxide may be recovered and can be reused as the copper source material. The copper source material preferably has a diameter of 0.1 mm or more and less than 10 mm.

The amount of the copper source material input in the electric furnace is preferably 0.3 or more, and more preferably 0.5 or more, in terms of mass ratio of the metallic copper, the copper oxide, or both of them, with respect to the material to be treated. A larger amount of the copper oxide added increases the contact chance between the PGM and the copper source material in the molten metal, and thus the migration of the PGM to the slag oxide can be reduced. Furthermore, a larger amount of the copper oxide added decreases the content of the PGM in the molten metal in the reducing furnace, which correspondingly facilitates the reduction of the amount of the PGM migrating to the slag oxide. The upper limit value of the amount of the copper source material added is preferably 0.9 or less in terms of mass ratio with respect to the material to be treated. The increase of the amount thereof added beyond the upper limit cannot further reduce the amount of the PGM migrating to the slag oxide, but tends to be uneconomical due to the increase of the amount of copper circulated in the process.

[Flux Component]

In the method for recovering platinum group metals of the present invention, at least one kind selected from the group consisting of $Al_2O_3$, $SiO_2$, CaO, $CaCO_3$, and FeO may be used as the flux component. The amount of the flux added is preferably controlled in such a manner that at least the amounts of Al, Si, and Fe contained in the material to be treated containing PGM are measured in advance, and the composition of the slag oxide formed through the reaction is controlled to the following range.

In the case where slag oxide has a component composition of $Al_2O_3$: 20 to 30% by mass, $SiO_2$: 25 to 40% by mass, CaO: 20 to 35% by mass, and FeO: 0 to 35% by mass (including 0%), the slag oxide has appropriate viscosity and good dispersibility and flowability, and therefore the platinum group metals mixed in the material to be treated can be readily absorbed to the molten metallic copper in the process of the separation by specific gravity. In this case, the slag oxide separated from the molten metal can have a component composition of Al: 10 to 22% by mass, Si: 10 to 16% by mass, Ca: 14 to 22% by mass, Fe: 27% by mass or less (including 0%), and Pt: 10 ppm or less, with the balance formed substantially of oxygen.

In the case where the slag oxide formed in the electric furnace is outside the aforementioned range, for example, $Al_2O_3$ exceeds 30% by mass, the viscosity of the slag is extremely increased, and as a result, the contact rate of the molten metallic copper reduced from the copper oxide and the PGM is lowered, the molten metallic copper absorbing the PGM tends to float in the slag, and the absorption rate of the PGM in the molten metal is decreased.

[Reducing Agent]

In the method for recovering platinum group metals of the present invention, the reducing agent is used mainly for the purpose of reducing the copper oxide to metallic copper. While the reducing agent may be coke or SiC as representative examples, a base metal containing gold and platinum group metals may also be used, and in this case, gold and platinum group metals in the base metal can also be recovered simultaneously. The resins, activated carbon, and the like used in electronic boards may also be used as the reducing agent.

[Silver Component]

One of the technical features of the method for recovering platinum group metals of the present invention is that at the time when the material to be treated containing PGM, the copper source material, the flux component, and the reducing agent are mixed and melted in a furnace under heating, and the molten metal absorbing the PGM and the slag oxide are separated, the content of silver (Ag) in the molten metal is controlled.

The mechanism that the increase of the Ag content in the molten metal reduces the amount of the PGM migrating to the slag oxide is not necessarily clear currently, and the present inventors consider as follows.

Specifically, it is considered that the increase of the Ag content in the molten metal lowers the distribution ratio to the slag of Fe, Ni, Pb, and the like, and the distribution ratio to the slag of PGM having high affinity to these elements is also reduced.

In the method for recovering platinum group metals of the present invention, at the time when the slag oxide and the molten metal are separated through difference in specific gravity after the heat melting treatment, the Ag content in the molten metal is controlled to 2,000 ppm or more and 8,000 ppm or less. An Ag content in the molten metal of less than 2,000 ppm exerts a less effect of suppressing the amount of the PGM migrating to the slag oxide. An Ag content exceeding 8,000 ppm is not preferred since the effect of suppressing the amount of the PGM migrating to the slag oxide is saturated, and the production cost is increased.

For controlling the Ag content in the molten metal to the aforementioned range, the mass ratio (Ag/PGM) of the Ag content to the PGM content in the material to be treated containing PGM is preferably controlled to 0.2 or more and 0.8 or less.

According to the control of the mass ratio, the Ag content in the molten metal can be controlled to the target range described above. An Ag/PGM ratio in the material to be treated containing PGM of less than 0.2 is not preferred since the amount of the PGM dissolved in Ag is decreased, and the recovery ratio of the PGM is lowered. With an Ag/PGM ratio exceeding 0.8, the cost of Ag may override the reduction of the PGM migrating to the slag oxide in some cases.

The Ag content in the material to be treated containing PGM can be controlled in the following manner. Some of the ordinary catalysts for cleaning automobile exhaust gas and the like contain a small amount of Ag, and the Ag content in the molten metal obtained with the catalysts is 1,600 ppm or less at a maximum. Accordingly, in the method for recovering platinum group metals of the present invention, Ag is necessarily further added to the material to be treated containing PGM. While an Ag ingot may be pulverized and added as Ag, it is preferred from the standpoint of the cost reduction that waste electronic boards containing a large amount of Ag, scraps and sludges containing Ag, and the like are added to the material to be treated containing PGM in pulverizing and mixing the material to be treated. In this case, it is preferred that the Ag content of the Ag-containing waste electronic boards is measured in advance, and the Ag content in the material to be treated containing PGM is controlled before inputting in the electric furnace.

[Heat Melting Treatment]

In the method for recovering platinum group metals of the present invention, a heat melting treatment is performed in such a manner that the copper source material, the flux component, and the reducing agent are added to the material to be treated containing PGM, which are melted under heating in a furnace, and the molten metal absorbing the PGM and the slag oxide are separated through difference in specific gravity. At this time, it is preferred that before inputting in the heating furnace, the material to be treated containing PGM and the copper source material are pulverized in advance and mixed with the flux component and the reducing agent both in the form of powder. The heating furnace may be an ordinary electric furnace, and the atmosphere in heating may be the air atmosphere. In the heat melting treatment performed, the readily oxidizable metals, such as chromium (Cr) and aluminum (Al), contained in the material to be treated containing PGM are partially oxidized, and form a glassy molten slag oxide along with the oxides originally contained in the material to be treated and the flux component, and the slag oxide having a small specific gravity floats on the molten metal. On the other hand, the copper oxide is reduced to metallic copper, and the molten metallic copper settles out in the molten slag oxide through difference in specific gravity, so as to form the molten metal as a lower layer under the molten slag oxide layer. As a result, the input materials are separated into the molten metal, mainly formed of copper, containing the PGM and the noble metals, such as Ag and Au, and the slag oxide.

The temperature for melting the input mixed materials under heating (meltdown temperature) is preferably 1,100° C. or more and 1,600° C. or less. A meltdown temperature of less than 1,100° C. is not preferred since the slag oxide formed tends to be melted insufficiently, and the viscosity of the molten slag is increased, resulting in decrease of the recovery ratio of the PGM. A meltdown temperature exceeding 1,600° C. is not preferred since the energy cost is increased, and furthermore the temperature may be a factor breaking the furnace body of the electric furnace. The meltdown temperature is more preferably 1,200 to 1,500° C. In the heat melting treatment, after melting the input materials, a statically standing step of retaining the materials for at least 5 hours, and preferably 10 hours or more, is preferably performed.

After the heat melting and the statically standing, the slag oxide floating on the molten metal is removed by a decantation operation or the like, and the molten metal absorbing the PGM is then delivered to the oxidation treatment as the subsequent step.

[Oxidation Treatment]

In the method for recovering platinum group metals of the present invention, the molten metal absorbing the PGM obtained through the heat melting treatment described above is subjected to the oxidation treatment, and an oxide layer containing copper oxide as a major component, and a molten metal containing metallic copper as a major component containing the PGM concentrated therein are separated through difference in specific gravity, so as to concentrate the PGM dissolved in the molten metal. With the oxidation treatment performed, copper in the molten metal is oxidized to copper oxide, and simultaneously iron (Fe), nickel (Ni), and the like contained in slight amounts in the molten metal are also oxidized to form the oxide layer, resulting in the molten metal of nearly pure copper containing the PGM and noble metals, such as Ag and Au, concentrated therein. While the amount of the molten metal is inevitably decreased through the oxidation treatment, the oxidation treatment is terminated before copper is entirely oxidized.

The oxidation treatment may be performed by retaining the molten metal in the furnace to a temperature of 1,100° C. or more and 1,600° C. or less, and preferably 1,200° C. or more and 1,500° C. or more, while introducing oxygen gas or an oxygen-rich gas thereto. A temperature of the molten metal of less than 1,100° C. is not preferred since the oxidation rate tends to decrease, and a temperature thereof exceeding 1,600° C. is also not preferred since the furnace body tends to be broken.

In the case where the molten metal obtained in the preceding step is heated, for example, in an oxidation furnace with a heavy oil burner, it is difficult to increase the temperature of the molten metal only by simply heating the atmosphere. Furthermore, the slag oxide having a high content of iron oxide and nickel oxide formed initially in the oxidation furnace has a high melting point and is poor in separability from the molten metal. Accordingly, the oxidation treatment is performed with an oxygen-rich gas, so as to increase the temperature of the molten metal. With the increase of the temperature of the molten metal, the slag oxide having a high content of iron and nickel is improved in flowability, and the separability between the slag and the molten metal is enhanced.

The oxygen-rich gas used is preferably a gas having an oxygen concentration of 27% by volume or more and 100% by volume or less. A gas having an oxygen concentration of 100% by volume means pure oxygen gas. An oxygen concentration of the oxygen-rich gas of less than 27% by volume is not preferred since there is no difference in oxidation rate and the like from the use of air.

Pure oxygen gas may be used in the oxidation treatment, but with an oxygen concentration exceeding 40% by volume, for example, the consumption of the lance of the furnace tends to be increased, and therefore the oxygen concentration is more preferably 27% by volume or more and 40% by volume or less. With an oxygen concentration in the range, the oxidation rate can be enhanced, and the migration of the platinum group metals into the slag in the oxidation furnace can be reduced.

The amount of the oxygen-rich gas blown into the furnace may be 30 Nm$^3$/ton-metal or more and 70 Nm$^3$/ton-metal or less in terms of amount thereof blown into 1 ton of the molten metal before the oxidation treatment.

After completing the oxidation treatment, the oxide layer constituted mainly of copper oxide as the upper layer is allowed to flow outside the oxidation furnace through decantation of the furnace, and thus separated from the molten metal. Subsequently, the molten metal containing the PGM concentrated therein as the lower layer is delivered and subjected to a PGM recovery process, which is the next step outside the scope of the present invention. At this time, it is preferred that the molten metal having the PGM concentrated therein obtained through only one time of the oxidation treatment is not delivered, but the molten metal absorbing the PGM obtained in the heat melting treatment is further input in the oxidation furnace for repeating the oxidation treatment, and at the time when the content of the PGM in the molten metal reaches 10 to 75% by mass, the molten metal is delivered and subjected to the next process for recovering the PGM.

The oxide layer allowed to flow out from the oxidation furnace is constituted mainly of copper oxide as described above, and therefore the oxide layer may be solidified by cooling after flowing out from the oxidation furnace, and can be reused as the copper source material in the heat melting treatment. According to the procedure, a small amount of the PGM accompanying the oxide layer can also be recovered.

In allowing the oxide layer to flow out from the oxidation furnace, the oxide layer can be converted to the form suitable for the copper source material in the heat melting treatment in such a manner that the oxide layer is quenched from the molten state through water cooling into a granulated state, resulting in the oxide formed mainly of copper oxide having a maximum diameter of 0.1 mm or more and 10 mm or less.

EXAMPLES

Example 1

A used bulk honeycomb type catalyst for cleaning automobile exhaust gas (fractions of converter) was pulverized to a maximum diameter of 400 μm or less with a roll mill and a pulverizer used in this order, so as to prepare an input material. A part of the input material was pulverized to an average particle diameter of 5 μm with a vibration mill to prepare a specimen for compositional analysis, which was measured in advance for the composition of the material to be treated with a fluorescent X-ray spectroanalyzer (model: Rigaku ZSX Primus II). Waste electronic boards containing Ag were measured for the composition and the Ag content in the same manner. The total of the mass of the input material and the mass of the waste electronic boards was the input mass of the material to be treated.

805 kg of the input material, 49 kg of the waste electronic boards (Ag content: 0.98 kg), and 296 kg of CaO as a flux component were weighed, and 30 kg of coke as a reducing agent and 300 kg of copper oxide (containing particles of 0.1 mm or more and 10 mm or less in an amount of approximately 80% by mass) were weighed, all of which were input in an electric furnace, and melted under heating to 1,350° C. After the meltdown, the molten material was allowed to stand at a temperature of 1,250 to 1,300° C. for approximately 5 hours, and subsequently a slag oxide as the upper layer was allowed to flow from the side of the electric furnace and then solidified by cooling.

The molten metal absorbing PGM in the electric furnace was delivered from the lower part of the electric furnace, and introduced to a heated oxidation furnace. The Ag content in the molten metal was 2,712 ppm. The mass ratio Ag/PGM of Ag to the total mass of the platinum group metals (Pt, Pd, and Rh) in the molten metal was 0.261.

Subsequently, an oxygen-rich gas having an oxygen concentration of 30.2% by volume was blown into the molten metal containing the PGM in the oxidation furnace, and then the oxygen-rich gas was blown onto the surface of the molten metal, so as to perform the oxidation treatment. At the time when the thickness of the layer of the oxide formed on the surface of the molten metal reached approximately 1 cm, the oxide was allowed to flow outside the furnace through decantation of the furnace, and the flowing oxide was input in a water tank and cooled with a large amount of flowing water.

The molten metal obtained by removing the oxide layer was entirely delivered from the oxidation furnace, solidified by cooling, and recovered as a PGM concentrate. The analysis thereof revealed that the content of metallic copper was 5.3 kg, and the content of the PGM was Pt: 18.5% by mass, Pd: 35.9% by mass, and Rh: 4.9% by mass. The content of the PGM contained in the slag oxide removed as the upper layer in the electric furnace was 0.9 ppm, which was, for example, a half or less of 1.94 ppm in Comparative Example 1 described later. It was therefore understood that the use of the method for recovering platinum group metals of the present invention reduces the amount of PGM migrating to the slag oxide.

The operation conditions and the operation results of this example are shown in Table 1. Table 1 also shows the results of the other examples and comparative examples.

TABLE 1

| | Input amount of waste catalyst (kg) | Input amount of waste electronic boards (kg) | Ag content of waste electronic boards (kg) | Input amount of copper source material (kg) | Oxygen concentration (% by volume) | Ag content in molten metal in electric furnace (ppm) | Ag/PGM | Ag content in slag oxide (ppm) |
|---|---|---|---|---|---|---|---|---|
| Example 1 | 805 | 49 | 0.98 | 300 | 30.2 | 2712 | 0.261 | 0.9 |
| Example 2 | 817 | 37 | 0.74 | 300 | 30.2 | 2064 | 0.200 | 1.3 |
| Comparative Example 1 | 829 | 25 | 0.5 | 300 | 25.0 | 1547 | 0.144 | 2.1 |
| Comparative Example 2 | 829 | 25 | 0.5 | 300 | 30.2 | 1547 | 0.144 | 4.9 |
| Comparative Example 3 | 829 | 25 | 0.5 | 227 | 30.2 | 1547 | 0.144 | 5.4 |

Example 2

817 kg of the waste catalyst and 37 kg of the waste electronic boards (Ag content: 0.74 kg) were input in an electric furnace, and the same operation as in Example 1 was performed. As a result, the Ag content in the molten metal was 2,064 ppm, and the mass ratio Ag/PGM of Ag to the total mass of the PGM in the molten metal was 0.200. The molten metal was subjected to the oxidation treatment under the same condition as in Example 1. As a result, the PGM concentrate had a content of metallic copper of 5.6 kg and a content of the PGM of Pt: 19.9% by mass, Pd: 34.4% by mass, and Rh: 4.5% by mass, and the content of the PGM contained in the slag oxide was 1.3 ppm.

Comparative Example 1

829 kg of the waste catalyst and 25 kg of the waste electronic boards (Ag content: 0.50 kg) were input in an electric furnace and melted under heating. As a result, the Ag content in the molten metal in the electric furnace was 1,547 ppm, and the ratio Ag/PGM was 0.144.

The molten metal was subjected to the oxidation treatment under the same condition as in Example 1. As a result, the PGM concentrate had a content of metallic copper of 5.3 kg and a content of the PGM of Pt: 20.0% by mass, Pd: 34.2% by mass, and Rh: 4.9% by mass, and the content of the PGM contained in the slag oxide removed as the upper layer in the electric furnace was 2.1 ppm, which was larger than in Examples.

Comparative Example 2

The same operation as in Comparative Example 1 was repeated except that an oxygen-rich gas having an oxygen concentration of 25.0% by volume was blown into the molten metal in the oxidation furnace in the initial stage, and then the oxygen-rich gas was blown onto the surface of the molten metal, so as to perform the oxidation treatment, and the PGM concentrate of this comparative example was recovered. The analysis thereof revealed that the content of metallic copper was 5.7 kg, and the content of the PGM was Pt: 17.9% by mass, Pd: 37.1% by mass, and Rh: 4.5% by mass. The content of the PGM contained in the slag oxide removed as the upper layer in the electric furnace was 4.9 ppm.

Comparative Example 3

The same operation as in Comparative Example 1 was repeated except that 227 kg of copper oxide was used as the copper source material, and the PGM concentrate of this comparative example was recovered. The analysis thereof revealed that the content of metallic copper was 4.8 kg, and the content of the PGM was Pt: 20.8% by mass, Pd: 34.1% by mass, and Rh: 4.8% by mass. The content of the PGM contained in the slag oxide removed as the upper layer in the electric furnace was 5.4 ppm.

It is apparent from the above results that according to the method for recovering platinum group metals of the present invention, the amount of the platinum group metals that is not recovered but migrates to the slag oxide can be reduced, and the platinum group metals can be recovered with a further enhanced recovery ratio.

What is claimed is:
1. A method for recovering platinum group metals, comprising:
   melting a material to be treated containing platinum group metals, under heating in a furnace, along with a copper source material containing at least one of a metallic copper and a copper oxide, a flux component, and a reducing agent;
   separating a molten metal absorbing the platinum group metals, and a slag oxide, through difference in specific gravity;
   then subjecting the molten metal absorbing the platinum group metals to an oxidation treatment to form an oxide layer and a molten metal containing metallic copper as a major component containing the platinum group metals concentrated therein; and
   separating the oxide layer containing copper oxide as a major component, and the molten metal containing metallic copper as a major component containing the platinum group metals concentrated therein, through difference in specific gravity, a silver content in the molten metal separated in melting under heating being controlled to 2,000 ppm or more and 8,000 ppm or less.

2. The method for recovering platinum group metals according to claim 1, wherein the molten metal separated in melting under heating has a mass ratio Ag/PGM of the silver content to a platinum group metal content of 0.2 or more and 0.8 or less.

3. The method for recovering platinum group metals according to claim 1, wherein the oxidation treatment is performed under supplying an oxygen-containing gas having an oxygen concentration of 27% by volume or more and 100% by volume or less, or oxygen.

4. The method for recovering platinum group metals according to claim 1, wherein the material to be treated containing platinum group metals is pulverized before inputting in the furnace to have a maximum particle diameter of less than 400 μm.

5. The method for recovering platinum group metals according to claim 1, wherein the copper source material is added in an amount of 0.3 or more and 0.9 or less in terms of mass ratio with respect to the material to be treated containing platinum group metals.

6. The method for recovering platinum group metals according to claim 1, wherein the separated oxide containing as a major component copper oxide is reused as the copper source material.

* * * * *